United States Patent
Noda et al.

(10) Patent No.: US 9,214,702 B2
(45) Date of Patent: Dec. 15, 2015

(54) BATTERIES FOR ELECTRIC TOOLS

(75) Inventors: Masafumi Noda, Anjo (JP); Jongwoon Yang, Yongin-si (KR)

(73) Assignee: MAKITA CORPORATION, Anjo (JP)

( * ) Notice: Subject to any disclaimer, the term of this patent is extended or adjusted under 35 U.S.C. 154(b) by 807 days.

(21) Appl. No.: 13/331,350

(22) Filed: Dec. 20, 2011

(65) Prior Publication Data

US 2012/0166847 A1    Jun. 28, 2012

(30) Foreign Application Priority Data

Dec. 28, 2010    (JP) .................................. 2010-292565

(51) Int. Cl.
| | |
|---|---|
| H02J 7/00 | (2006.01) |
| G06F 1/26 | (2006.01) |
| G06F 1/00 | (2006.01) |
| H01M 10/42 | (2006.01) |
| H01M 10/48 | (2006.01) |
| H01M 10/0525 | (2010.01) |

(52) U.S. Cl.
CPC ........ H01M 10/4207 (2013.01); H01M 10/425 (2013.01); H01M 10/482 (2013.01); H01M 10/0525 (2013.01)

(58) Field of Classification Search
CPC .................................................. H01M 10/4207
USPC .................. 320/128; 713/320, 323, 324, 340; 702/60, 63
See application file for complete search history.

(56) References Cited

U.S. PATENT DOCUMENTS

| | | | | |
|---|---|---|---|---|
| 6,317,697 | B1 * | 11/2001 | Yoshikawa | ....... G01R 19/16542 320/149 |
| 7,830,121 | B2 * | 11/2010 | Sasaki | .......................... 320/134 |
| 2005/0007068 | A1 | 1/2005 | Johnson et al. | |
| 2008/0111520 | A1 | 5/2008 | Sasaki | |
| 2010/0085010 | A1 | 4/2010 | Suzuki et al. | |
| 2010/0310907 | A1 | 12/2010 | Miller et al. | |

FOREIGN PATENT DOCUMENTS

| | | |
|---|---|---|
| CN | 101620427 A | 1/2010 |
| EP | 2 317 598 A1 | 5/2011 |
| JP | A-10-164764 | 6/1998 |
| JP | A-11-198057 | 7/1999 |
| JP | A-11-283677 | 10/1999 |
| JP | A-2010-93953 | 4/2010 |

OTHER PUBLICATIONS

Apr. 4, 2012 European Search Report issued in European Application No. 11195505.0.
Office Action issued in Korean Patent Application No. 10-2011-0137409 mailed Jun. 27, 2013 (with translation).
Japanese Patent Office, Notification of Reasons for Rejection mailed Sep. 24, 2014 in Japanese Patent Application No. 2010-292565 w/English-language Translation.
Jan. 6, 2014 Chinese Search Report issued in Application No. 201110447677.6 (with translation).

* cited by examiner

Primary Examiner — Richard V Muralidar
(74) Attorney, Agent, or Firm — Oliff PLC (57) ABSTRACT

A battery for an electric tool includes at least one battery cell, a peripheral device operable to detect a battery condition of the at least one battery cell, and a microcomputer communicating with the peripheral device. The microcomputer periodically operates the peripheral device for detecting the battery condition during the time when the battery is not electrically connected to the electric tool.

15 Claims, 7 Drawing Sheets

BATTERIES FOR ELECTRIC TOOLS

This application claims priority to Japanese patent application serial number 2010-292565, the contents of which are incorporated herein by reference.

BACKGROUND OF THE INVENTION

1. Field of the Invention

The present invention relates to batteries used for electric tools, and in particular to batteries used as power sources of electric tools.

2. Description of the Related Art

A known battery used for an electric tool is disclosed, for example, in Japanese Laid-Open Patent Publication No. 2010 93953. The battery disclosed in this publication can operate in an active mode during use of the battery, i.e., when a battery charger is connected to the battery or when the electric tool is connected to the battery and a tool main switch is turned on. In the active mode, a power is supplied to a peripheral circuit under the control of a microcomputer for performing a charge control or a discharge control of the battery.

The battery operates in a sleep mode during the non-use of the battery. In the sleep mode, the microcomputer stops the supply of power to the peripheral circuit. Therefore, it is possible to save the power consumption of the battery during non-use of the battery.

However, in the sleep mode, a part of the function of the microcomputer is stopped or the microcomputer stops the operation of the peripheral circuit. Therefore, it is not possible to detect the condition of the battery, such as a temperature, a voltage and a discharge current of the battery. For this reason, historical data of the battery condition cannot be obtained in the sleep mode.

The period of life of the battery may be largely affected by the environmental condition, such as an ambient temperature of the place where the battery is positioned. However, because the historical data cannot be obtained during the sleep mode, it is difficult to recognize as to what environmental condition the battery has been placed during the sleep mode.

Therefore, there has been a need for a technique that enables to obtain data of a battery condition even during non-use of the battery.

SUMMARY OF THE INVENTION

According to the present teachings, a battery for an electric tool includes at least one battery cell, a peripheral device operable to detect a battery condition of the at least one battery cell, and a microcomputer communicating with the peripheral device. The microcomputer periodically operates the peripheral device for detecting the battery condition during the time when the battery is not electrically connected to the electric tool.

DETAILED DESCRIPTION OF THE INVENTION

Each of the additional features and teachings disclosed above and below may be utilized separately or in conjunction with other features and teachings to provide improved batteries. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a battery for an electric tool includes at least one battery cell, a microcomputer and a peripheral circuit. The microcomputer performs a control according to an active routine during use of the battery and performing a control according to a sleep routine during non-use of the battery. The peripheral circuit can detect a battery condition of the at least one battery cell and communicates with the microcomputer. According to the active routine, the microcomputer operates in an active mode for activating the peripheral circuit and for performing a charge or discharge control of the at least one battery cell. According to the sleep routine, the microcomputer operates in a sleep mode for inactivating the peripheral circuit while the microcomputer periodically changes the operation mode from the sleep mode to the active mode, so that the microcomputer can obtain data of the battery condition detected by the peripheral circuit in the active mode.

Therefore, the battery condition can be periodically detected even during execution of the sleep routine. As a result, it is possible to obtain a historical data of the battery condition without a blank period.

The battery condition may include a temperature and/or a voltage and/or a discharge current of the at least one battery cell, and the peripheral circuit may include a temperature detection circuit for detecting the temperature of the at least one battery cell and/or a voltage detection circuit for detecting the voltage of the at least one battery cell and/or a current detection circuit for detecting the discharge current of the at least one battery cell.

Therefore, it is possible to obtain data of the ambient temperature and/or the battery voltage and/or the discharge current even during non-use of the battery.

The battery may further include a memory device capable of storing the data of the battery condition detected by the peripheral circuit. Therefore, the memory device can store a historical data of the battery condition.

The battery may further include a first counter, and the microcomputer may count up the first counter each time when the operation mode is changed from the sleep mode to the active mode. This enables calculation of time during execution of the sleep routine. In other words, it is possible to obtain cumulated time during non-use of the battery.

The microcomputer periodically changes the operation mode from the sleep mode to the active mode for a first period, and the microcomputer periodically counts up a second counter for a second period during the active mode. This enables to calculate the time during the active mode. In other words, it is possible to obtain cumulated time during use of the battery. The second counter may be a different counter from the first counter. Alternatively, the first counter may also serve as the second counter.

The battery may further include a connector for connecting the memory device to an external device, so that the data stored in the memory device can be transmitted to the external device via the connector. For example, the external device may be a personal computer that can read the data stored in the memory device.

Figure 1:
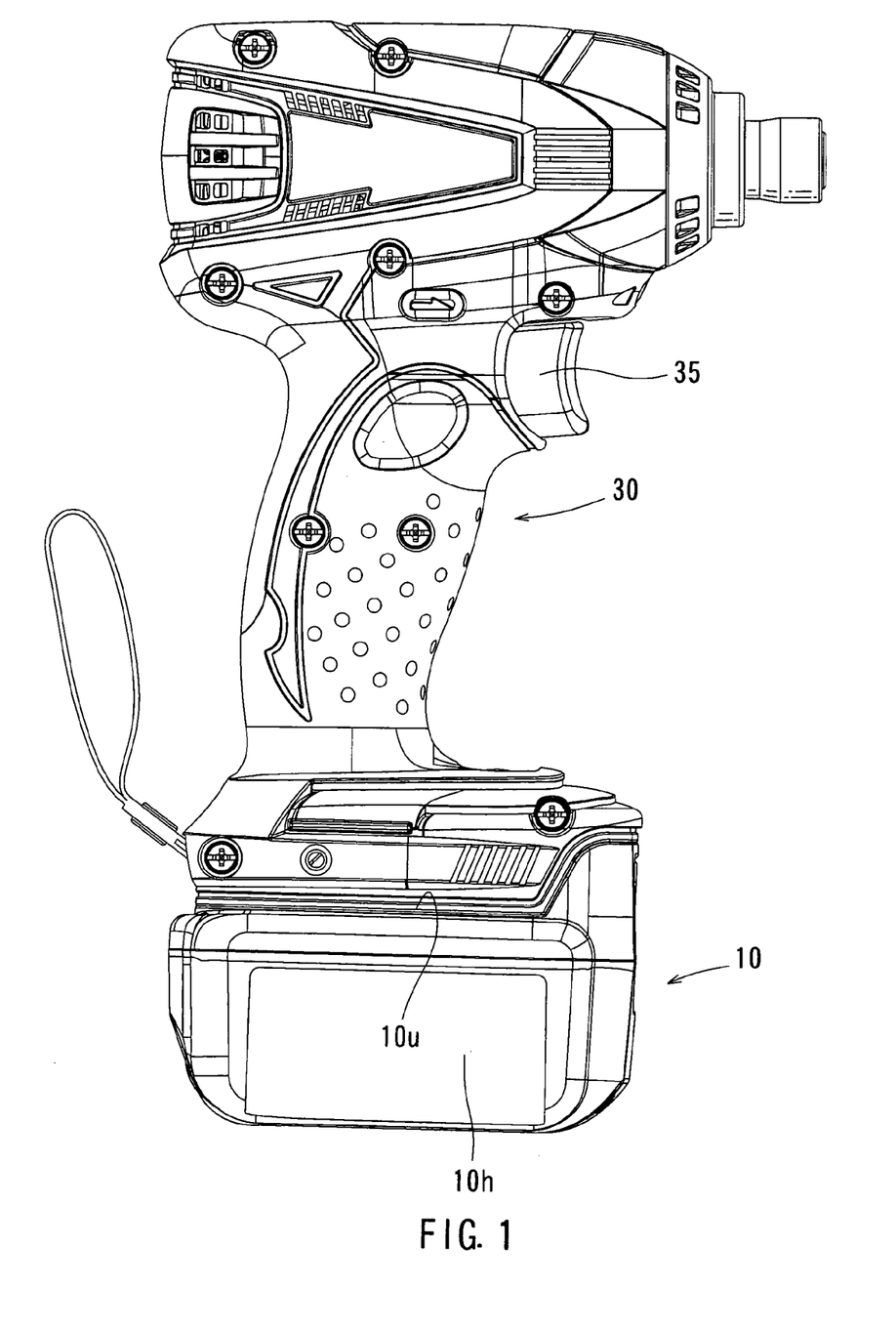
FIG. 1 is a perspective view of an electric tool and a battery according to a representative example of the present invention and showing the state where the battery is connected to the electric tool.

A representative example will now be described with reference to FIGS. 1 to 8. Referring to FIG. 1, there is shown a battery 10 connected to an electric tool 30.

<General Construction of Battery>

Figure 2:
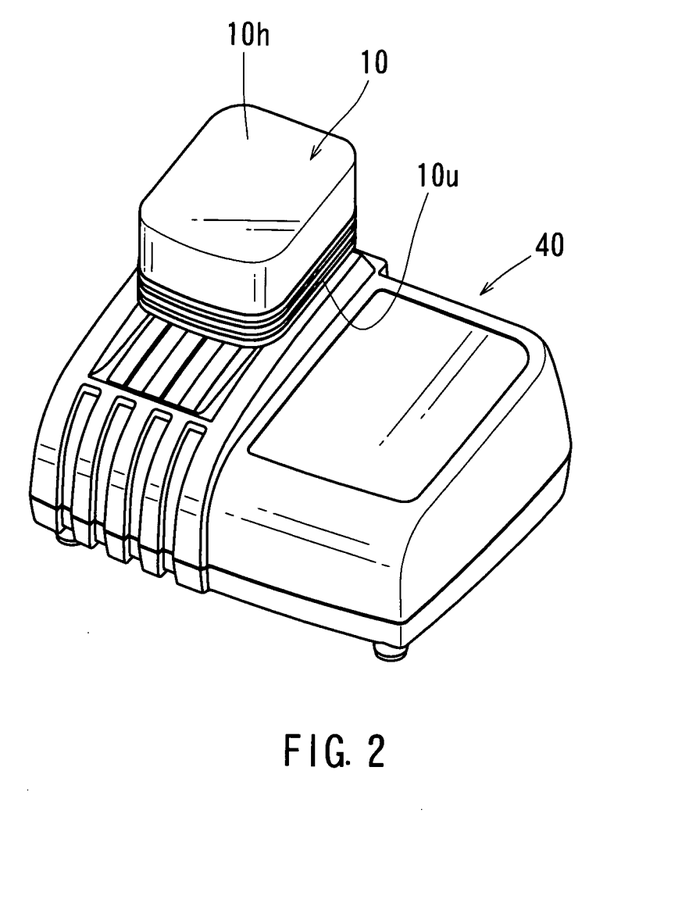
FIG. 2 is a perspective view showing the state where the battery is connected to a battery charger.

The battery 10 can be connected to the electric tool 30 for use as a power source of the electric tool 30 as shown in FIG. 1. In addition, as shown in FIG. 2, the battery 10 can be connected to a battery charger 40 that can recharge the battery 10.

Figure 3:
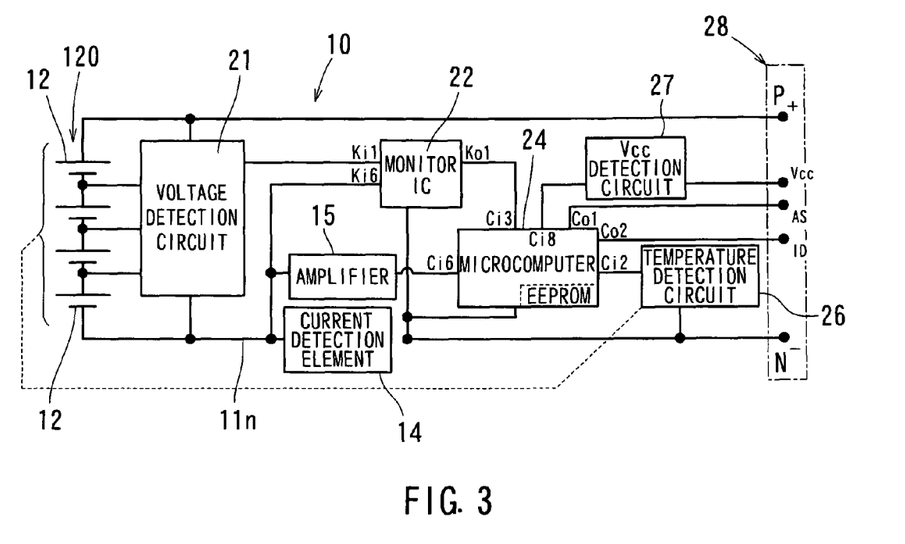
FIG. 3 is a block diagram of an electric circuit of the battery.

As shown in a circuit configuration of FIG. 3, the battery 10 may include a plurality of battery cells 12 serving as secondary battery cells. For example, the battery cells 12 may be lithium-ion battery cells. The battery cells 12 are connected in series in order to supply a desired voltage. A shunt resistor 14 serving as a current detection device is provided in a negative line 1 in that is connected to the negative side of the serially connected battery cells 12.

The shunt resistor 14 may have a relatively small resistance value in order to suppress a voltage drop. Therefore, a discharge current or a charge current of the battery cells 12 is detected as a small voltage signal (corresponding to a converted value from the current) by the shunt resistor 14. The small voltage signal is amplified by an amplifier 15 to a predetermined voltage level, and the amplified voltage signal is then input to a monitoring section 22 and a control microcomputer 24. The voltage signal amplified by the amplifier 15 will be hereinafter also called "a discharge current signal" or "a charge current signal."

A thermistor (not shown) is attached to an assembly of the serially connected battery cells 12 (hereinafter called "a cell assembly 120") and can detect the temperature of the cell assembly 120. An output signal from the thermistor is converted into a voltage signal by a temperature detection circuit 26, and the voltage signal is then input to the control microcomputer 24.

<Voltage Detection Circuit and Monitoring Section>

The battery 10 includes a voltage detection circuit 21 in addition to the monitoring section 22 and the control microcomputer 24 and the temperature detention circuit 26.

The voltage detection circuit 21 serves to detect the voltage of each of the battery cells 12 and can output a voltage signal corresponding to the voltage of the serially connected battery cells 12 (i.e., the voltage of the cell assembly 120) to the monitoring section 22. The voltage of the serially connected battery cells 12 will be hereinafter called "a battery voltage", and the voltage signal corresponding to the battery voltage will be hereinafter called "a voltage signal" of the battery cells 12.

The monitoring section 22 may be an integrated circuit (IC) that serves to convert the voltage signal of the battery cells 12, the discharge current signal and the charge current signal into digital data that is transmitted to the control microcomputer 24. As shown in FIG. 3, the monitoring section 22 has an input terminal ki1 for receiving the voltage signal of the battery cells 12, an input terminal ki6 for receiving the discharge current signal and the charge current signal, and an output terminal koi from which the digital date is transmitted to the control microcomputer 24.

<Control Microcomputer>

The control microcomputer 24 performs a discharge control and a charge control based on the voltage data of the battery cells 12, the current data of the discharge current and the charge current, the temperature data of the battery cells 12, etc. As shown in FIG. 3, the control microcomputer 24 has an input terminal ci3 for receiving the data transmitted from the monitoring section 22, an input terminal ci6 for receiving the charge current signal and the discharge current signal, and an input terminal ci2 for receiving the temperature signal from the temperature detection circuit 26. The control microcomputer 24 also includes an input terminal ci8 for receiving a detection signal from a Vcc detection circuit 27 that detects a voltage Vcc of a constant-voltage power source of the charger 40.

The control microcomputer 24 further includes an output terminal co1 for outputting an operation stop signal to the electric tool 30, and a communication terminal co2 for communicating with the battery charger 40 or a personal computer (not shown).

<Connector of Battery>

The voltage detection circuit 21, the monitoring section 22, the control microcomputer 24, the temperature detection circuit 26, etc. are disposed within a housing 10h of the battery 10 (see FIGS. 1 and 2). A connector 28 for electrically connecting the battery 10 to the electric tool 30 and the battery charger 40 (see FIG. 3) is mounted to an upper surface 10u of the housing 10h (see FIG. 1). As shown in FIG. 3, the connector 28 includes a positive terminal P and a negative terminal N connected to a positive electrode and a negative electrode of the cell assembly 120. The connector 28 also includes a terminal Vcc connected to the Vcc detection circuit 27, an auto-stop terminal AS connected to the output terminal co1 of the control microcomputer 24, and a terminal ID connected to the communication terminal co2 of the control microcomputer 24.

Figure 5:
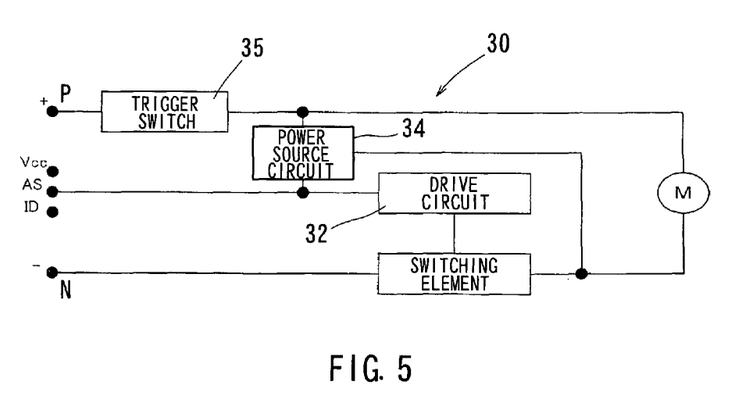
FIG. 5 is a block diagram of an electric circuit of the electric tool.

When the battery 10 is mechanically connected to the electric tool 30 as shown in FIG. 1, the positive terminal P and the negative terminal N of the battery 10 are connected to a power source terminal P and a power source terminal N of the electric tool 30 (see FIG. 5). In addition, the auto-stop terminal AS of the battery 10 is connected to an auto-stop terminal AS of the electric tool 30 as shown in FIG. 5. The auto-stop terminal AS of the electric tool 30 is connected to a drive circuit 32.

When a trigger switch 35 serving as a tool main switch of the electric tool 30 is pushed to be turned from an off position to an on position, power is supplied from the battery 10 to a power source circuit 34, so that a voltage is produced at the auto-stop terminal AS of the electric tool 30. Therefore, the control microcomputer 24 can detect the on-operation of the trigger switch 35 based on the voltage signal that is input to the output terminal co1 of the control microcomputer 24 disposed within the battery 10.

Figure 4:
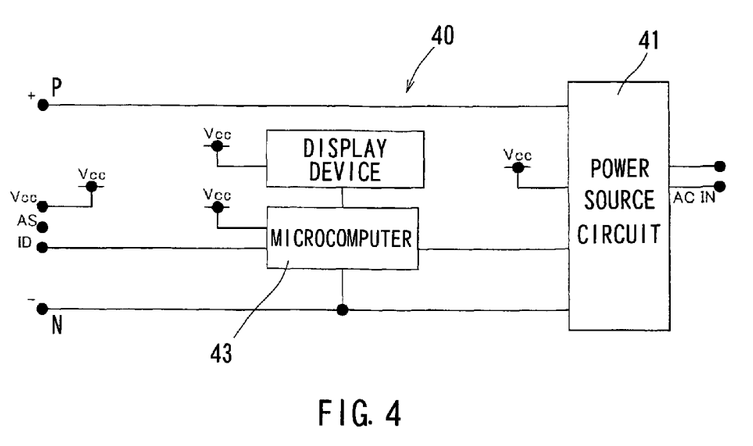
FIG. 4 is a block diagram of an electric circuit of the battery charger.

On the other hand, when the battery 10 is connected to the charger 40, the positive and negative terminals P and N of the battery 10 are connected to a positive charge terminal P and a negative charge terminal N of a power source circuit 41 of the charger 40 (see FIG. 4). In addition, the terminal Vcc of the battery 10 is connected to a constant-voltage power source terminal Vcc of the charger 40, and the terminal ID of the battery 10 is connected to a communication terminal ID of a microcomputer 43 of the charger 40.

<Operation of Battery>

The operation of the battery 10 will now be described with reference to the flowcharts shown in FIGS. 6 and 7. A program for executing the processes according to the flowcharts shown in FIGS. 6 and 7 may be stored in a memory device of the control microcomputer 24.

First, the operation of the battery 10 will be described with respect to the operation in an active mode performed during use of the battery 10 when the battery 10 is mechanically and electrically connected to the battery charger 40 or when the battery 10 is mechanically and electrically connected to the electric tool 30 and the trigger switch 35 (see FIGS. 1 and 5) is turned on. The process routine executed in the active mode will be hereinafter called "an active routine."

Figure 6:
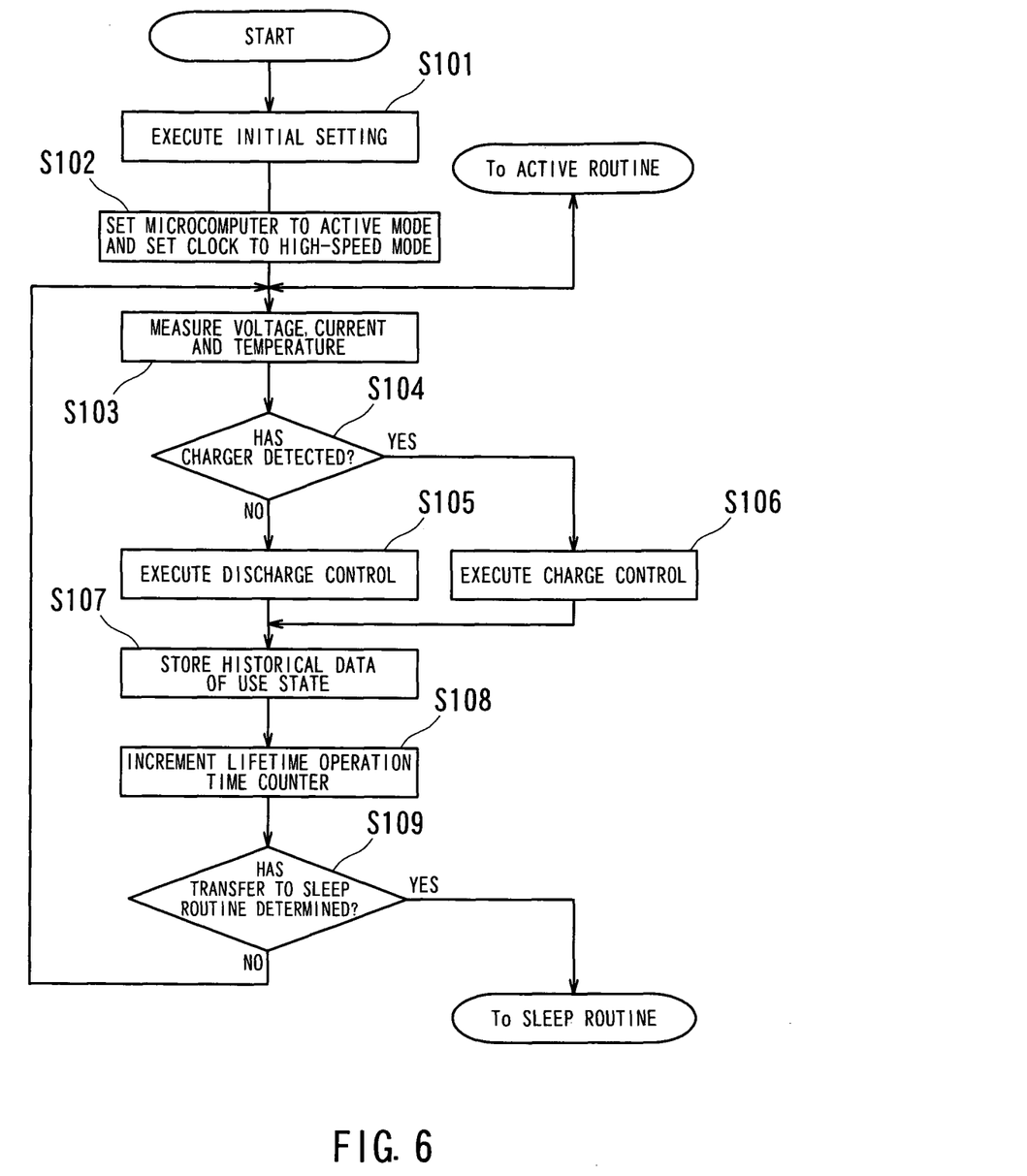
FIG. 6 is a flowchart performed according to an active routine of the battery.

In the active routine shown in FIG. 6, the process first proceeds to Steps S101 and 102, in which an initial setting and an active setting (clock high-speed setting) of the control microcomputer 24 are performed. Then, power is supplied to peripheral circuits of the control microcomputer 24. The peripheral circuits may include the voltage detection circuit 21, the monitoring section 22, the amplifier 15, the temperature detection circuit 26 and the Vcc detection circuit 27. Thereafter, the process proceeds to Step S103, in which the voltage value, the discharge current or the charge current, and the temperature of the battery cells 20 of the battery 10 are detected or determined.

The process further proceeds from Step S103 to Step S104 in which a determination is made as to whether or not the battery 10 is electrically connected to the battery charger 40. If the battery 10 is electrically connected to the battery charger 40 (see FIG. 2), the Vcc detection circuit 27 (see FIG. 3) detects the Vcc voltage of the battery charger 40, so that the determination in Step S104 becomes YES. In this ease, the process further proceeds to Step S106 in which a charge control process is performed. If the battery 10 is connected to the power tool 30 (see FIG. 1), the Vcc detection circuit 27 (see FIG. 3) cannot detect the Vcc voltage of the battery charger 40, so that the determination in Step S104 becomes NO. In this case, the process further proceeds to Step S105 in which a discharge control process is performed. The process proceeds from S105 and S106 to Step 107, in which historical date during the operation of the battery 10 (i.e., during the use of the battery 10) is stored in a memory device (e.g., an EEPROM) that is provided in the control microcomputer 24. The historical data may include the voltage value of the battery cells 12 (hereinafter simply called "battery voltage"), the discharge current or the charge current, the temperature of the battery cells 12 (hereinafter simply called "battery temperature"), etc.

Next, the process proceeds to Step S108, in which a counter (lifetime operation time counter) is counted up. The counter is provided in the memory device (e.g., EEPROM) of the control microcomputer 24. Then, the process proceeds to Step S109, in which a determination is made as to whether or not the process is to be transferred to a sleep routine shown in FIG. 7.

Here, the counter (lifetime operation time counter) serves to count the time elapsed after shipping the battery 10 from a factory where the battery 10 was manufactured.

The sleep routine is a process routine executed in the sleep mode during non-use of the battery 10, i.e., when the battery 10 is not electrically connected to any of the battery charger 40 and the electric tool 30 or when the trigger switch 35 (see FIGS. 1 and 5) is not turned on although the battery 30 is electrically connected to the electric tool 30. The operation flowchart of the battery 10 in the sleep mode will now be described with reference to FIG. 7.

If the determination in Step S109 becomes NO during the operation of the battery 10 in the active mode, the process returns to Step S103. Thus, as long as the battery 10 operates in the active mode, steps S103 to S109 are repeatedly performed with a predetermined cyclic period, e.g., 0.5 second. The counter (lifetime operation time counter) is counted up by the number of cycles of the predetermined cyclic period of the steps 103 to 109.

For example, if the battery 10 is disconnected from the battery charger 40 after completion of the charge operation, the determination in Step S109 becomes YES. After a predetermined time, e.g., about one minute from the determination YES in Step 109, the process transfers to the sleep routine (see FIG. 7).

Figure 7:
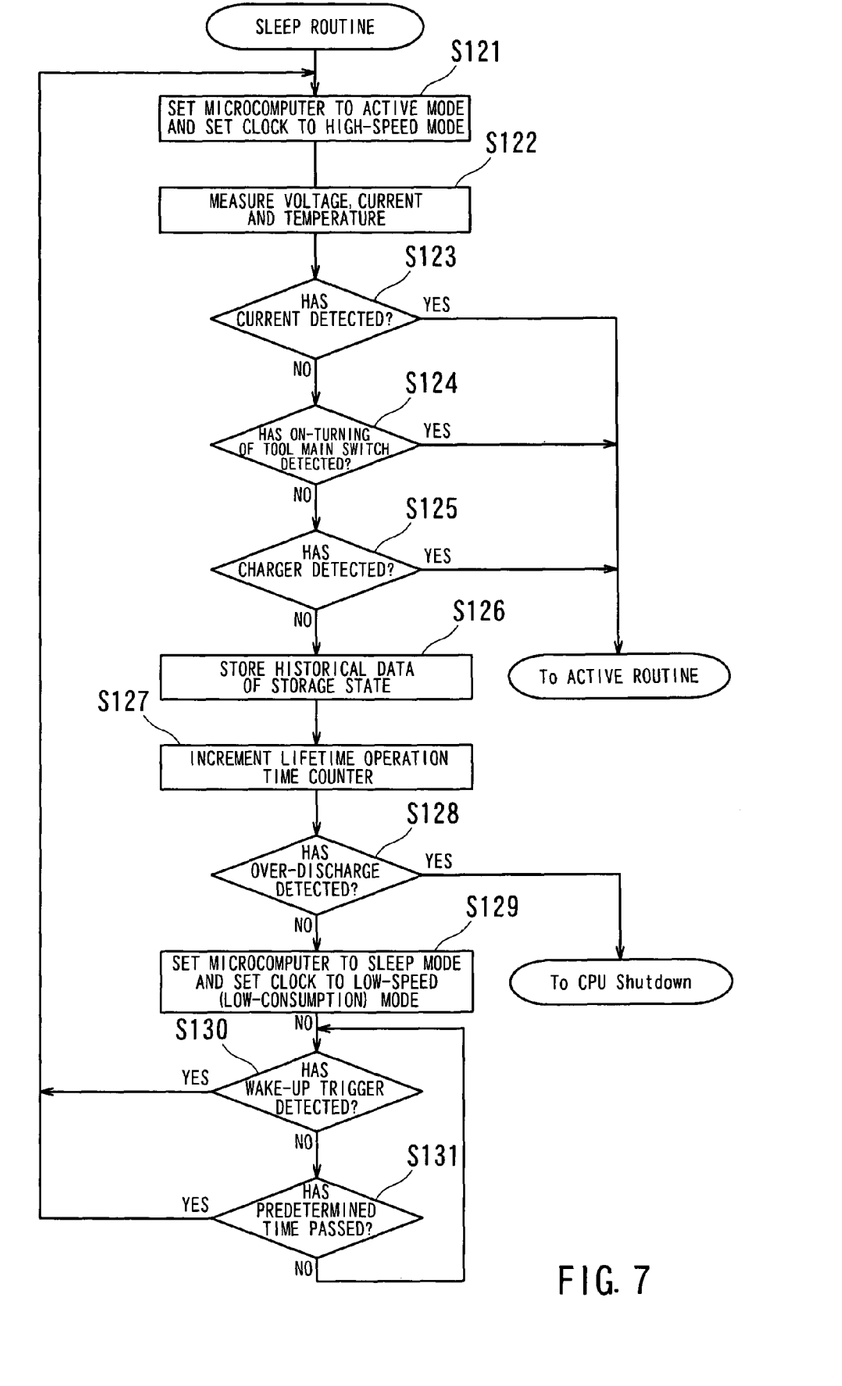
FIG. 7 is a flowchart performed according to a sleep routine of the battery.

After the process has transferred to the sleep routine shown in FIG. 7, the active setting (clock high-speed setting) of the control microcomputer 24 is again performed in Step S5121, and power is supplied to the peripheral circuits of the control microcomputer 24 including the voltage detection circuit 21, the monitoring section 22, the amplifier 15, the temperature detection circuit 26 and the Vcc detection circuit 27. Thereafter, the process proceeds to Step S122, in which the voltage value of the battery cells 20 of the battery 10 (battery voltage), the discharge current or the charge current, and the temperature of the battery cells 20 (battery temperature) are detected or determined. Thus, the battery voltage, the discharge current or the charge current, and the battery temperature at the time of transfer to the sleep routine is detected or determined. The process further proceeds to steps S123, S124 and S125. In step S123, a determination is made as to whether or not the discharge current has been detected or determined. In step S124, a determination is made as to whether or not the on state of the trigger 35 has been detected or determined. In step S125, a determination is made as to whether or not the battery 10 has been electrically connected to the battery charger 40. If the determination in either of steps S123, 124 and 125 is YES, the process returns to the active routine shown in FIG. 6. More specifically, the process proceeds to step S103 of the active routine.

If all the determinations made in steps S123, S124 and S125 are NO, in other words, if no discharge current has been detected in Step S123, the on-state of the trigger switch 35 has not been detected in Step S124 and, no electrical connection to the battery charger 40 has been detected in Step S125, the process proceeds to step S126, in which data including the battery voltage, the discharge current and the battery temperature, etc. at the time of transfer to the sleep routine is stored in the memory device (e.g. EEPROM).

After step S126, the process proceeds to step S127, in which the lifetime operation time counter is counted up, and the process further proceeds to step S128, in which a determination is made as to whether or not the battery 10 is in an overdischarge state. The overdischarge state is the state where the battery voltage (voltage of the serially connected battery cells 20) is lower than an allowable value. If the determination in step S128 is YES, the controller microcomputer 24 is shut down, and the operation of the battery 10 is terminated.

If the determination in step S128 is NO, the process proceeds to step S129, in which a sleep setting (clock low-speed setting) of the control microcomputer 24 is made.

Then, supply of power to the peripheral circuits including the voltage detection circuit 21, the monitoring section 22, the amplifier 15, the temperature detection circuit 26 and the Vcc detection circuit 27 is terminated, so that the operations of the peripheral circuits are stopped. In this way, the battery 10 is transferred to the sleep mode that is a low power-consumption mode. Thereafter, steps S130 and S131 are repeatedly performed until a wake-up trigger is detected or until a predetermined time (e.g., about one minute) has been elapsed after starting the sleep mode (low power-consumption mode). In step S130, a determination is made as to whether or not the wake-up trigger has been detected. In step S131, a determination is made as to whether or not the predetermined time has been elapsed after starting the sleep mode. In this way, if the wake-up trigger has been detected in Step S131 and if the predetermined time has been elapsed after starting the sleep mode in Step S131, the process then returns to step S121. Therefore, the active setting of the control microcomputer 24 is made again, and the power is supplied to the peripheral circuits including the voltage detection circuit 21, the monitoring section 22, the amplifier 15, the temperature detection circuit 26 and the Vcc detection circuit 27. The battery voltage, the discharge or charge current and the battery temperature are detected or determined in step S122, and the detected or determined data is stored in step S126. Thereafter, the counter (life operation time counter) is counted up in step S127, and the battery 10 is transferred to the sleep mode (low power-consumption mode) in step S129. The sleep mode continues until the predetermined time has been elapsed in step S131.

Figure 8:
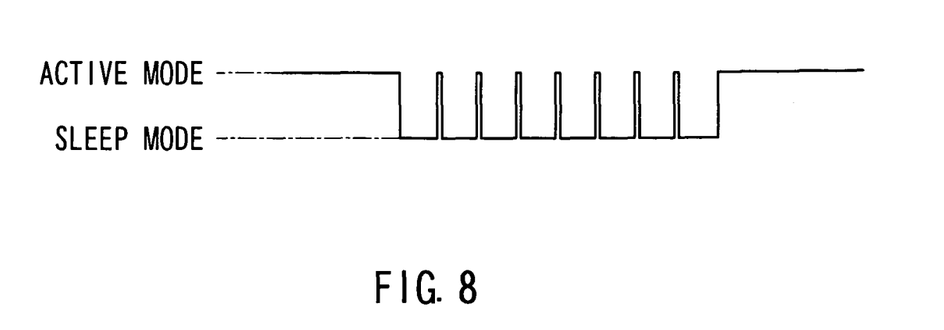
FIG. 8 is a time chart during no-use of the battery.

As described above, if the process is transferred from the active routine shown in FIG. 6 to the sleep routine shown in FIG. 7 and the operation mode of the battery 10 is changed from the active mode to the sleep mode, the sleep mode continues for the predetermined time (e.g. about one minute). Thereafter, the operation mode is charged to the active mode that continues for a short period time as shown in FIG. 8, so that the battery voltage, the discharge or charge current and the battery temperature are detected or determined, and the lifetime operation time counter is counted up. In the sleep routine, the counter is counted up by the number of 120 counts in Step S17 for consistency with the cyclic period (e.g., about 0.5 second) in the active routine. Thus, 120 counts of the counter correspond to one minute (the predetermined time in Step S131) if one count corresponds to 0.5 second. By multiplying the count number by the predetermined time (e.g., 0.5 second) corresponding to one count, it is possible to obtain the time elapsed after the battery 10 has been manufactured (more specifically, the time elapsed after the battery 10 has been shipped).

The sleep mode continues for the predetermined time (e.g., about one minute) before the sleep mode is switched to the active mode that continues for a short time (e.g. about one minute). This change from the sleep mode to the active mode is repeatedly performed. In this way, the lifetime operation counter counts up even after the operation mode has been changed from the sleep mode to the active mode. As noted above, the active mode continues for a short time, e.g., about 0.5 second.

During the sleep mode, if the connection between the battery 10 and the battery charger 40 is detected or if the on-state of the trigger switch 35 is detected, the determination in step S130 (determining as to whether or not the wake-up trigger is detected) becomes YES, and the process is transferred to the active routine shown in FIG. 6 via step S121 through step S125.

<Advantages of Battery of Present Example>

According to the battery 10 of this example, in the sleep routine, the operation mode of the control microcomputer 24 is periodically changed from the sleep mode to the active mode in which the battery condition is determined. In other words, the battery condition, such as the battery voltage, the discharge or charge current and the battery temperature, can be periodically detected in the sleep routine. Therefore, no blank period may occur to the historical data of the battery condition.

In addition, the historical data can be stored in the memory device (e.g., EEPROM) provided in the control microcomputer 24.

Further, it is possible to count the time during the sleep mode, i.e., the time during non-use of the battery 10. It is also possible to count the time during the active mode, i.e., the time during the use of the battery 10.

Furthermore, because the output terminal co2 of the control microcomputer 24 is connected to the communication terminal (ID terminal), the historical data stored in the memory device (e.g., EEPROM) can be read by an external personal computer or the like.

Possible Modification

The above example can be modified in various ways. For example, although the memory device (e.g., EEPROM) of the control microcomputer 24 was used as a memory device for storing the data of the battery condition, it is possible to use a separate memory device provided externally of the control microcomputer 24 for storing the data.

In addition, although the operation mode is changed from the sleep mode to the active mode for a cyclic period of about one minute in the sleep routine, such a cyclic period can be suitable set to the other period than one minute.

Further, if the capacity of the lifetime operation counter is limited, it is possible to provide a second counter in addition to the lifetime operation counter (first counter) that operates to count up in the active routine. During the active mode changed from the sleep mode periodically in the sleep routine, the second counter may be counted up by one count for each cycle of change of the operation mode in the sleep routine. In this case, the time elapsed after manufacturing the battery 10 (more specifically, after shipping the battery) can be calculated from the following formula:

(count number of lifetime operation time counter)*(number of cycles in active routine)+(count number of second counter)*(number of cycles in sleep routine)

What is claimed is:

1. A battery for an electric tool, the battery comprising:
   at least one battery cell;
   a microcomputer configured to perform (i) a control according to a first routine during use of the battery and (ii) a control according to a second routine during non-use of the battery; and
   a peripheral circuit configured to detect a battery condition of the at least one battery cell and communicating with the microcomputer, wherein
   the first routine provides an active mode that activates the peripheral circuit, so that a charge control or a discharge control of the at least one battery cell can be performed, the second routine (a) provides a sleep mode that inactivates the peripheral circuit and (b) causes a change from the sleep mode to the active mode after a predetermined period of time, so that the microcomputer can obtain data of the battery condition from the peripheral circuit when in the active mode of the second routine, and when the microcomputer is performing the second routine, the microcomputer counts up a first counter each time that the sleep mode is changed to the active mode after the predetermined period of time.

2. The battery as in claim 1, wherein the battery condition includes a temperature of the at least one battery cell, and the peripheral circuit comprises a temperature detection circuit for detecting the temperature of the at least one battery cell.

3. The battery as in claim 1, wherein the battery condition includes a voltage of the at least one battery cell, and the peripheral circuit comprises a voltage detection circuit for detecting the voltage of the at least one battery cell.

4. The battery as in claim 1, wherein the battery condition includes a discharge current of the at least one battery cell, and the peripheral circuit comprises a current detection circuit for detecting the discharge current.

5. The battery as in claim 1, further comprising a memory device capable of storing the data of the battery condition detected by the peripheral circuit.

6. The battery as in claim 5, further comprising a connector for connecting the memory device to an external device, so that the data stored in the memory device can be transmitted to the external device via the connector.

7. The battery as in claim 1, wherein the microcomputer counts up the first counter each time when the sleep mode is changed to the active mode.

8. The battery as in claim 7, wherein the microcomputer periodically changes from the sleep mode to the active mode for a first period, and the microcomputer periodically counts up a second counter for a second period during the active mode.

9. The battery as in claim 8, wherein the first counter also serves as the second counter.

10. The battery as in claim 7, further comprising a current detection circuit for detecting a discharge current of the at least one battery cell, wherein the microcomputer causes change from the sleep mode to the active mode without counting up the first counter if the current detection circuit detects the discharge current.

11. The battery as in claim 7, wherein
the microcomputer is configured to detect an on operation of a trigger switch of the electric tool, and
the microcomputer causes change from the sleep mode to the active mode without counting up the first counter if the on operation of the trigger switch is detected.

12. The battery as in claim 7, wherein
the microcomputer is configured to detect a connection state of the battery to a battery charger, and
the microcomputer causes change from the sleep mode to the active mode without counting up the first counter if the connection state is detected.

13. A battery for an electric tool, the battery comprising:
at least one battery cell;
a peripheral device operable to detect a battery condition of the at least one battery cell; and
a microcomputer communicating with the peripheral device, so that the peripheral device periodically detects the battery condition under the control of the microcomputer during the time when the battery is in a non-use state, wherein the microcomputer performs (i) a control according to a first routine during use of the battery and (ii) a control according to a second routine during non-use of the battery, the peripheral device comprises a peripheral circuit, the first routine provides an active mode that activates the peripheral circuit, so that a charge control or a discharge control of the at least one battery cell can be performed, the second routine (a) provides a sleep mode that inactivates the peripheral circuit and (b) causes periodical change from the sleep mode to the active mode, so that the microcomputer can obtain data of the battery condition from the peripheral circuit when in the active mode of the second routine, the non-use state is a state where an electric power of the at least one battery cell is not supplied to the electric tool and the at least one battery cell is not electrically connected to a battery charger, and when the microcomputer is performing the second routine, the microcomputer counts up the first counter each time when the sleep mode is changed to the active mode.

14. A battery for an electric tool, the battery comprising:
at least one battery cell;
a peripheral device operable to detect a battery condition of the at least one battery cell; and
a microcomputer communicating with the peripheral device, so that the peripheral device periodically detects the battery condition under the control of the microcomputer during the time when the battery is in a non-use state, wherein the peripheral device comprises a detection device, the microcomputer is configured to supply the electric power to the detection device when the battery is electrically connected to the electric tool or a battery charger, the microcomputer is configured to periodically supply the electric power of the at least one battery cell to the detection device when the battery is not connected to either the electric tool or the battery charger, the non-use state is a state where an electric power of the at least one battery cell is not supplied to the electric tool and the at least one battery cell is not electrically connected to a battery charger, and the microcomputer is configured to count up a counter to count a time (i) during connection of the battery to the electric tool or the battery charger and (ii) during non-connection of the battery to either the electric tool or the battery charger.

15. The battery as in claim 14, further comprising a memory device capable of storing data of the condition of the battery cell detected by the detection device.

* * * * *